(12) United States Patent
Richards et al.

(10) Patent No.: US 11,514,678 B2
(45) Date of Patent: Nov. 29, 2022

(54) DATA PROCESSING METHOD AND APPARATUS FOR CAPTURING AND ANALYZING IMAGES OF SPORTING EVENTS

(71) Applicants: Sony Europe B.V., Basingstoke (GB); Sony Group Corporation, Tokyo (JP)

(72) Inventors: Mathew Richards, Basingstoke (GB); Edward Hawke, Basingstoke (GB); Luke Dodd, Basingstoke (GB); Hattori Hironori, Tokyo (JP)

(73) Assignees: Sony Europe B.V., Weybridge (GB); Sony Group Corporation, Tokyo (JP)

( * ) Notice: Subject to any disclaimer, the term of this patent is extended or adjusted under 35 U.S.C. 154(b) by 82 days.

(21) Appl. No.: 17/110,718

(22) Filed: Dec. 3, 2020

(65) Prior Publication Data
US 2021/0182560 A1 Jun. 17, 2021

(30) Foreign Application Priority Data
Dec. 13, 2019 (GB) ...................... 1918370

(51) Int. Cl.
*G06V 20/40* (2022.01)
*G06T 7/73* (2017.01)
*G01S 19/48* (2010.01)

(52) U.S. Cl.
CPC ............ *G06V 20/42* (2022.01); *G01S 19/485* (2020.05); *G06T 7/74* (2017.01)

(58) Field of Classification Search
CPC .......... G06V 20/42; G06T 7/74; G01S 19/485
USPC .......................................................... 382/100
See application file for complete search history.

(56) References Cited

U.S. PATENT DOCUMENTS

| | | | |
|---|---|---|---|
| 9,094,615 B2* | 7/2015 | Aman ................. | H04N 5/268 |
| 10,134,146 B2* | 11/2018 | Saleemi ............... | G06T 11/206 |
| 11,030,775 B2* | 6/2021 | Messely ............... | H04N 7/183 |
| 2013/0303248 A1 | 11/2013 | Williams et al. | |
| 2017/0148174 A1 | 5/2017 | Kim et al. | |
| 2018/0350084 A1 | 12/2018 | Tamir et al. | |
| 2019/0114485 A1* | 4/2019 | Chan .................. | G11B 27/031 |

OTHER PUBLICATIONS

Pettersen et al., "Soccer Video and Player Position Dataset", MMSys '14, Mar. 19-21, 2014, 6 pages.
Ren et al., "Tracking the soccer ball using multiple fixed cameras", Computer Vision and Image Understanding 113 (2009), pp. 633-642.

* cited by examiner

*Primary Examiner* — Gabriel I Garcia
(74) *Attorney, Agent, or Firm* — Oblon, McClelland, Maier & Neustadt, L.L.P.

(57) ABSTRACT

A data processing method comprising obtaining information identifying a position of an object in a scene at a time during a sporting event; obtaining an image of the scene captured at the time during the sporting event; projecting the position of the object in the scene onto an image plane of the image; and outputting information based on the projection.

13 Claims, 16 Drawing Sheets

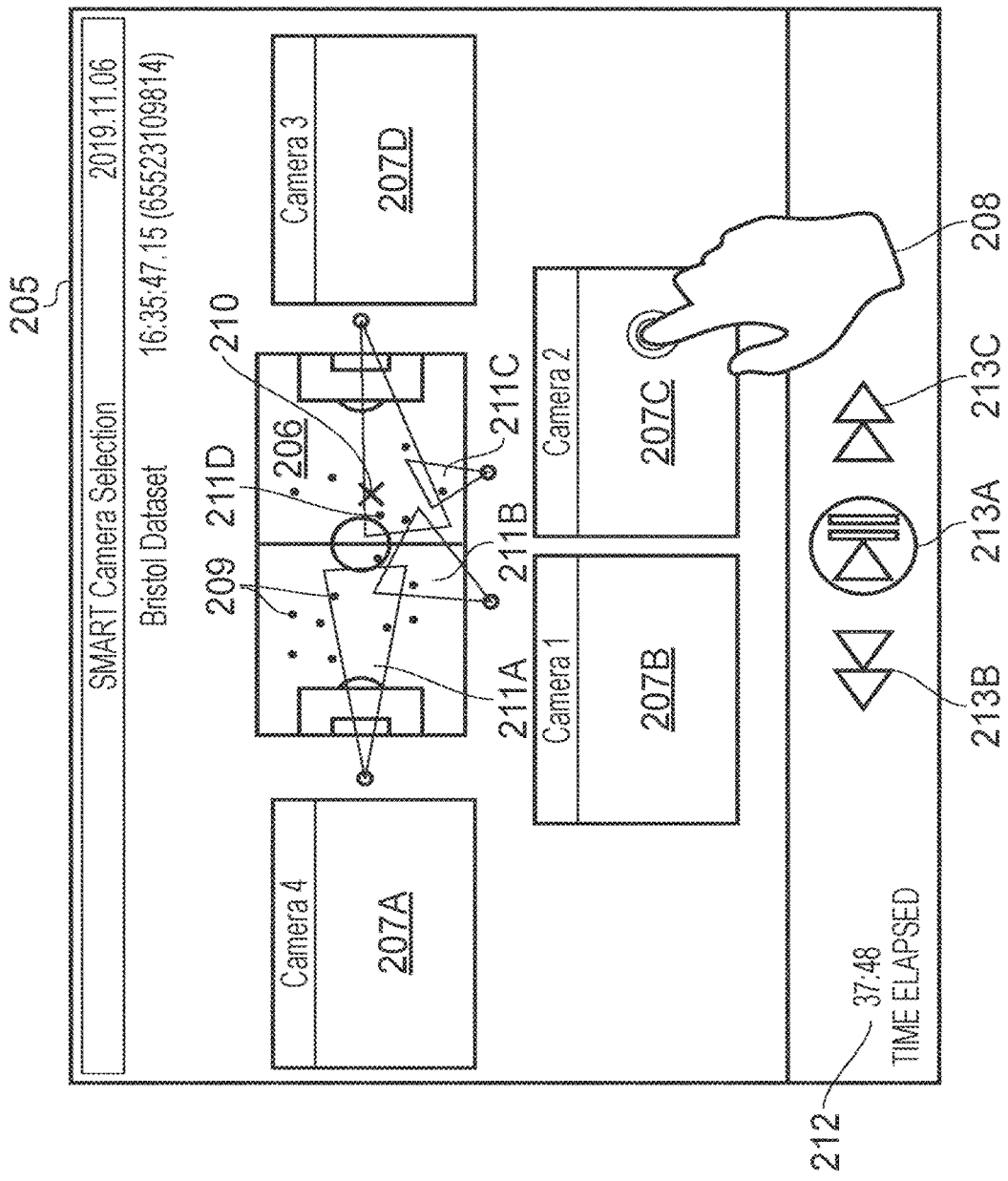
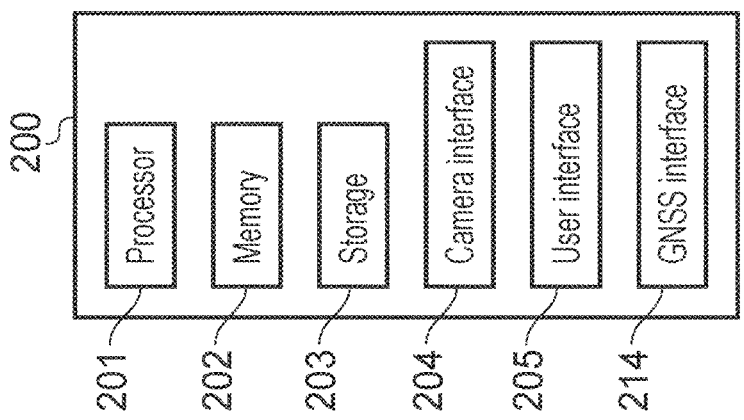

DATA PROCESSING METHOD AND APPARATUS FOR CAPTURING AND ANALYZING IMAGES OF SPORTING EVENTS

BACKGROUND

Field of the Disclosure

The present disclosure relates to a data processing method and apparatus.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Advances in image processing technology have made it possible to capture and analyse images of sporting events in higher volumes and in more detail than ever before. One example application of this technology is video assistant referee (VAR) technology which allows events in a soccer game such as a foul or a goal to be reviewed using images of the event captured from different angles. Another example application of this technology is using one or more cameras to track the progress of participants in a race (e.g. horse racing or motor racing). However, there remains a desire for this technology to be improved and for it to be used in new ways.

SUMMARY

The present disclosure is defined by the claims.

BRIEF DESCRIPTION OF THE DRAWINGS

Non-limiting embodiments and advantages of the present disclosure will be best understood by reference to the following detailed description taken in conjunction with the accompanying drawings, wherein:

FIGS. 2A and 2B schematically show a data processing apparatus and user interface according to an embodiment;

Like reference numerals designate identical or corresponding parts throughout the drawings.

DETAILED DESCRIPTION OF THE EMBODIMENTS

FIGS. 1-6 show a first example of the present technique relating to a soccer game.

Figure 1A:
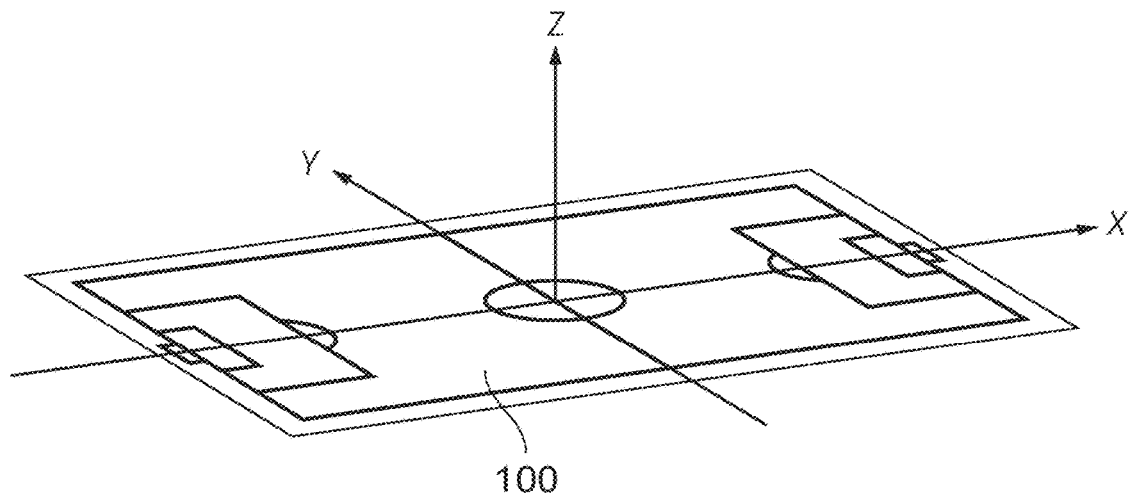
FIGS. 1A and 1B schematically show a soccer pitch.
Figure 1B:
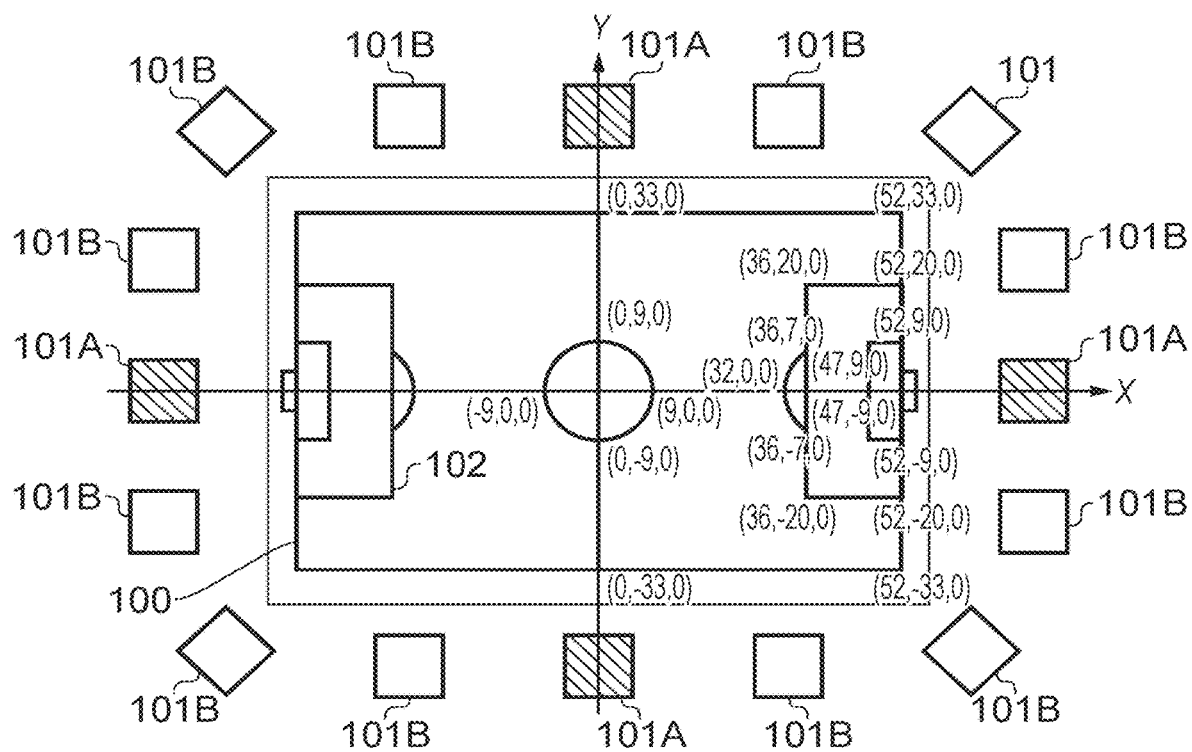

FIGS. 1A and 1B show a soccer pitch 100 with respect to which various axes X, Y and Z are defined. A location on the soccer pitch can therefore be defined by appropriate X, Y and Z coordinates. FIG. 1A is a perspective view of the soccer pitch. FIG. 1B is a birds eye view of the soccer pitch. FIG. 1B shows a plurality of cameras 101 located around the soccer pitch. Each of the cameras 101 captures images of soccer players and a soccer ball on the soccer pitch during a soccer game.

There are two types of cameras, static cameras 101A and rotatable cameras 101B. Each static camera 101A remains fixed so that its field of view of the soccer pitch remains fixed throughout the soccer game. Each movable camera 101B is rotatable so that is field of view of the soccer pitch is changeable during the soccer game. Each movable camera 101B is rotatable about one or more rotation axes (each of which allows the camera to pan, tilt and roll, respectively). In this example, there are four static cameras 101A each located halfway along a respective side of the soccer pitch. Each static camera 101A has a field of view including the entire soccer pitch. There are also ten rotatable cameras 101B located in respective further locations around the soccer pitch. Each rotatable camera 101B can be rotated to keep one or more particular soccer players within its field of view as those soccer players move around the pitch, for example. This is referred to as "following" those one or more soccer players. A zoom level of each rotatable camera 101B is also adjustable. This enables soccer players to be followed at any location on the pitch by zooming in to players that are further from the camera and zooming out from players that are nearer to the camera. The zoom level is adjusted optically or digitally. A different number of static and/or rotatable cameras may be used.

Because the field of view of the static cameras 101A includes the entire soccer pitch and does not change, each of the static cameras can be calibrated so that the position of an object on the pitch is mapped to a corresponding position of that object in an image of the pitch captured by the camera. If the object is captured by a plurality of differently positioned static cameras, the 3D position of the object on the pitch can be determined from the 2D position of the object in each captured image. Each static camera is calibrated in advance using static features of the pitch such as the pitch lines 102.

Calibrating the rotatable cameras 101B in this way is more difficult because the field of view of each camera is changeable by rotating the camera and/or adjusting the zoom of the camera. There are therefore many different possible fields of view of each rotatable camera and some of those fields of view (e.g. views which follow a particular player with a high level of zoom) may not contain any static features of the pitch to aid calibration. It is therefore difficult to map a position of an object on the pitch to a corresponding position of that object in an image captured of the pitch by a rotatable camera.

The ability to map objects on the pitch with objects in an image captured by one or more rotatable cameras is desirable in applications such as VAR technology in which the VAR referee may wish to review an event during the soccer match (e.g. a foul or goal) which may have potentially been captured by one or more of the rotatable cameras. If there are many rotatable cameras, it is time consuming and labour intensive for the VAR referee to review footage from all the rotatable cameras recorded during the event in question in order to determine which of those cameras captured the event. It is therefore desirable for objects on the pitch involved in the event (e.g. one or more soccer players and/or the soccer ball) to be mapped to images of the event captured by one or more of the rotatable cameras and for those images to be indicated to the VAR referee. This reduces the time and labour required by the VAR referee because they then only need to review the successfully mapped images rather than all images captured by all rotatable cameras. For example, if images of a foul involving two players and the ball are captured by only two out of ten rotatable cameras, it is desirable for images from the two cameras to be indicated to the VAR referee rather than the VAR referee having to review the images of all ten cameras. This is possible by attempting to map the players and ball involved in the foul with the images captured by each of the rotatable cameras and indicating to the VAR referee the images with the most successful mapping.

FIG. 2A shows a data processing apparatus 200 according to an embodiment. The data processing apparatus 200 comprises a processor 201 for processing electronic instructions, a memory 202 for storing the electronic instructions to be processed and input and output data associated with the electronic instructions, a storage medium (e.g. in the form of a hard disk drive, solid state drive or the like) for long term storage of data, a camera interface for receiving image data representing captured images from each of the static and rotatable cameras 101A, 101B, a user interface 205 for receiving input commands from a user and outputting information to the user and, optionally, a Global Navigation Satellite System GNSS interface 214 for receiving GNSS location information from one or more GNSS receivers. Each of the processor 201, memory 202, storage medium 203, camera interface 204, user interface 204 and GNSS interface 215 are implemented using appropriate circuitry, for example. The processor 201 controls the operation of each of the memory 202, storage medium 203, camera interface 204, user interface 204 and GNSS interface 214.

The user interface is shown in FIG. 2B. The user interface 205 is a touch screen in this example. The user interface 205 may take a different form such as a non-touch screen with a keyboard and mouse, a voice command interface or the like. The user interface 205 may be separate to the data processing apparatus 200 but connected to the data processing apparatus via a suitable connection which allows input commands received by the user interface and output information to be output by the user interface to be transmitted between the data processing apparatus and user interface.

The touch screen of FIG. 2B displays a pitch image 206 representing the soccer pitch 100 and a plurality of camera images 207A-207D captured by respective rotatable cameras 101B.

The pitch image 206 indicates the position 209 of each player on the pitch and the position 210 of the soccer ball on the pitch. The player and ball positions are determined by the processor 201 analysing images captured by the static cameras 101A in accordance with static camera calibration information stored in advance in the storage medium 203. The processor 201 identifies the ball and each player as unique objects using the captured images and any suitable known object recognition technique. For example, the processor 201 uses a semantic segmentation algorithm designed to differentiate the foreground (player or ball) from the background (e.g. pitch, grass or stadium) in real-time. One such known algorithm is the "Objects as Points" algorithm developed at The University of Texas at Austin and University of California, Berkeley.

Each camera image 207A-D is selectable by the user (e.g. VAR referee) touching the touch screen 205 at the location on the touch screen at which that camera image is displayed using a finger of their hand 208. Selecting a camera image 207A causes a larger version of the image to be displayed on the touch screen. This allows the user to view the selected image in more detail. The images 207A-D are a subset of all images captured by the rotatable cameras 101B. The images in the subset are determined as the images which have the best mapping for objects in the scene associated with a particular event which is to be reviewed. The pitch image 206 also includes a field of view graphic 211A-D for each respective image 207A-D indicating an estimated field of view of the rotatable camera at the time that image was captured. FIGS. 3-6 explain how the images with the best mapping and estimated fields of view are determined.

Each static and rotatable camera 101A, 101B captures images at a predetermined frame rate (e.g. 50 Hz) throughout the duration of the soccer match. The images are timestamped with their capture time to enable images captured by different cameras at the same time to be associated with each other by the processor 201. This allows the positions of the ball and each player on the pitch to be determined and shown on the pitch image 206 for every set of static camera images captured at the same time. It also allows one or more of the rotatable camera images captured at that time to be displayed with the pitch image 206. In FIG. 2B, the pitch image 206 represents the positions of the ball and players 37 minutes 48 seconds into the soccer game. Similarly, the images 207A-D are the images captured by respective rotatable cameras 101B 37 minutes 48 seconds into the soccer game.

The elapsed time 212 of the soccer game is displayed together with virtual buttons 213A-C which are touchable by the user to adjust the elapsed time and therefore the ball and player positions on the pitch image 206 and the images 207A-D which are displayed.

If the user touches the button 213A, a "play" state is entered in which the ball and player positions on the pitch image are updated and successively captured images 207A-D are displayed at the predetermined frame rate at which images are captured. In this case, the images 207A-D appear as a video image of the soccer match and the ball and player positions appear to change at a speed mimicking that of the soccer match. If the user touches the button 213A again, a "pause" state is entered in which the images 207A-D and ball and player positions remain static as those associated with the elapsed time 212 displayed when the button 213A was pressed. The user may alternately toggle between the "play" and "pause" states by successive touches of the button 213A.

The button 213B is a "rewind" button which causes the elapsed time to run backwards whilst displaying the associated ball and player positions and images 207A-D. The speed at which the elapsed time runs backwards (the "rewind speed") is adjustable based on how many times or for how long the button 213B is pressed, for example.

The button 213C is a "fast forward" button which causes the elapsed time to run forwards whilst displaying the associated ball and player positions and images 207A-D at a speed greater than that of the "play" state. The speed at which the elapsed time runs forwards (the "fast forward speed") is adjustable based on how many times or for how long the button 213C is pressed, for example.

The buttons 213A-C therefore allow the user to navigate to the time of an event of interest (e.g. a foul or goal) and review the event via the images 207A-D. A user interface other than buttons 213A-C (e.g. an interactive progress bar or the like) may be used to navigate through the soccer match.

When the user wishes to review a particular event, the user adjusts the elapsed time 212 to the time of the event (or to a time just before the event). They then indicate the location on the pitch at which the event occurred. They do this by touching an appropriate location of the pitch image 206, for example. In response, the processor 201 determines all detectable objects (e.g. players and the ball) within a predetermined distance (e.g. 15 metres) of the indicated location. The processor then performs a mapping process to try to map the determined objects to each of the images captured by the rotatable cameras 101B at the selected elapsed time. The four images with the best mapping are then displayed as the images 207A-207D with the pitch image. A number of images with the best mapping other than four (e.g. a single image with the best mapping or the three images with the best mapping) may be displayed. The user is therefore presented with a subset of all rotatable camera images captured at the elapsed time which are most likely to show the event in question. The time and labour of the user in reviewing the rotatable camera images to find those showing the event is therefore reduced.

FIGS. 3-6 demonstrate how a rotatable camera image with the best mapping of an object of interest (e.g. a player within the predetermined distance of an indicated location on the pitch) is determined. It is also demonstrated how the parameters of the rotatable camera 101B which captured the image are estimated.

Figure 3:
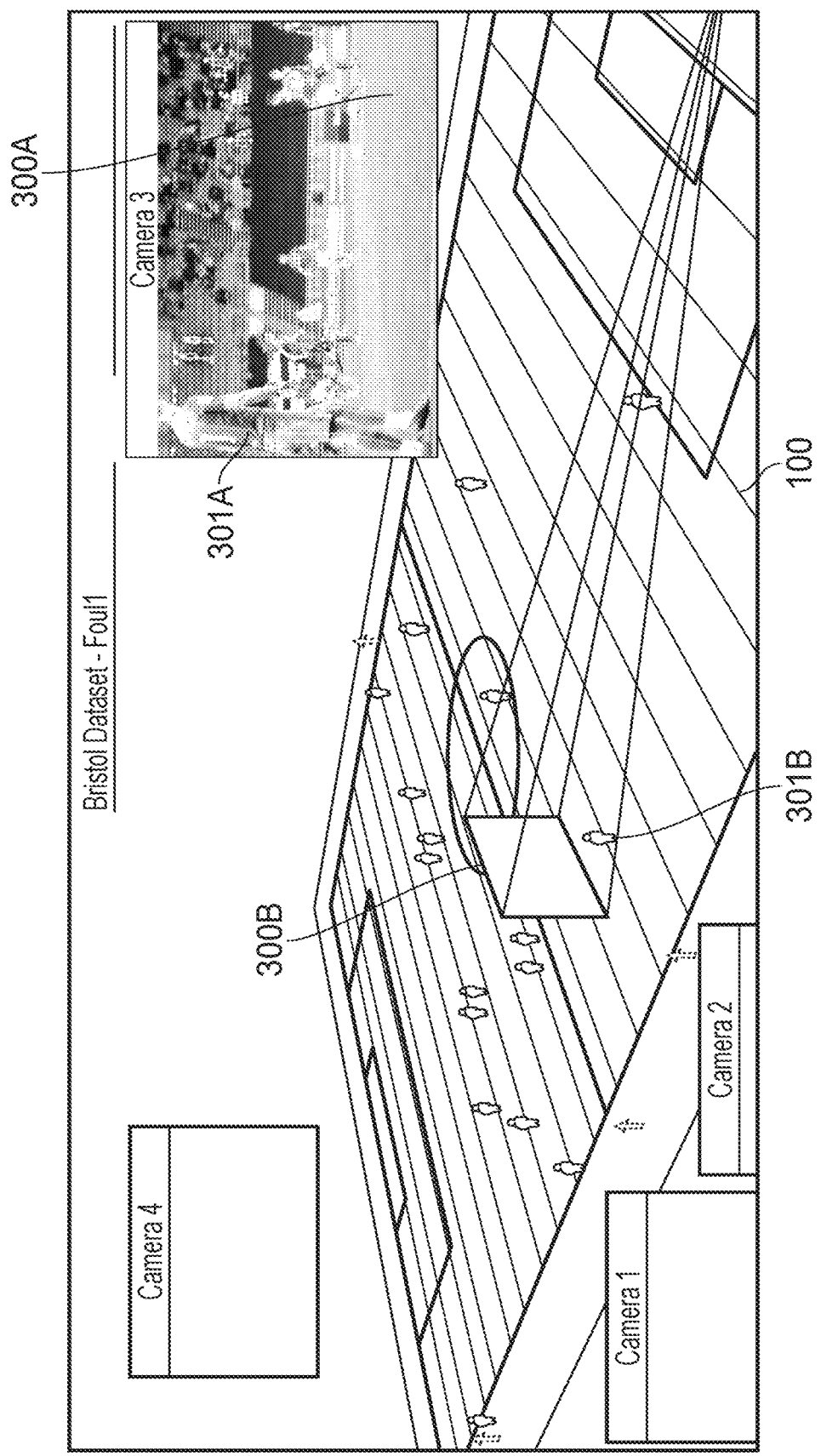
FIG. 3 schematically shows a rotatable camera image plane.

FIG. 3 shows a captured rotatable camera image 300A and its associated image plane 300B within the 3D space of the pitch. In effect, 3D objects on the pitch (e.g. one or more players and/or the ball) within the field of view of the rotatable camera 101B which captures the image 300A are projected on the 2D image plane 300B to form the image 300A. In this example, the object of interest is a player 301B which appears as a player image 301A in the image 300A. The player image 301A is a portion of the image 300A. The player 301B is determined as an object of interest because they are within a predetermined distance of an indicated location on the pitch, for example. The problem is that, because the rotatable cameras 101B are not calibrated in the same way as the static cameras 101A, it is difficult to determine the field of view and image plane 300B associated with the image 300A. It is therefore difficult to know in advance if the image 300A includes the player 301B as the object of interest. The user is therefore required to manually review the image 300A (together with the images captured by all other rotatable cameras at the same time) to determine that the player 301B is included in the image 300A and that images from the rotatable camera which captured the image 300A are therefore likely to be suitable to review the event concerned (e.g. a foul involving the player 301B).

To alleviate this problem, the processor 201 determines a visual characteristic of the player 301B which distinguishes the player 301B from other objects in the scene at the time the image 300A was captured using the static camera images captured at that time. The image 300A is then analysed to determine if any object in the image 300A has that visual characteristic and, if so, it is determined that the player 301B was captured in the image 300A. The image 300A is then displayed as one of the images 207A-D, for example. If not, the image 300A is determined not to be relevant to the event concerned and the image is not displayed as one of the images 207A-D. This is repeated for all other rotatable images captured at the same time The displayed subset of rotatable camera images 207A-D are the rotatable camera images with the best match of the visual characteristic and therefore the rotatable camera images which likely have the best view of the event concerned.

The time and labour required by the user to find the best rotatable camera images of the event concerned is therefore reduced. All the user has to do is set the elapsed time to that of the event concerned (or just before) and indicate the location of the event on the pitch. The processor then analyses all rotatable camera images captured at that time and returns a subset of the rotatable camera images most likely to show the event concerned.

In an embodiment, the visual characteristic of the player 301B is visual marking on the player such as the combination of team strip colours and player number which is unique to each player on the pitch. In another embodiment, the visual characteristic is the pose of the player. The pose of the player is a simplified 3D representation of the positions of parts of the player (e.g. joints and limbs) which are detectable by the processor 201 using the static camera images and a human pose estimation algorithm which discretely identifies joints, limbs and the orientation of each player in real-time. For example, a suitable known algorithm from the field of articulated body pose estimation may be used. It is very unlikely that any two players have the same pose at the same time, thereby making the pose suitable as a unique visual characteristic of the player 301B in a set of rotatable camera images captured at the same time. Using the pose is also advantageous since it does not rely on a specific visual marking of the player 301B (e.g. the player's number) being visible in the image. A combination of visual characteristics of the player 301B (e.g. pose and player number) may be used.

Because the rotatable camera 101B which captured the image 300A is not calibrated in the same way as the static cameras 101A, the correct image plane 300B is not known in advance. To determine whether the player 301B has been captured in the image 300A using the player's pose, the player's pose in 3D is therefore projected onto a plurality of potential 2D image planes of the rotatable camera which captured the image 300A. The projected pose of each potential image plane is then compared with a detected 2D pose of the player image 301A in the captured image 300A. If there is a sufficient match between the projected 3D pose of the player 301B and the 2D pose of the player image 301A for one of the potential image planes, then the player image 301A is determined to correspond to the player 301B and the image 300A is determined to be an image including the player 301B (and therefore the event concerned). This is referred to as player pose processing.

This is exemplified in FIGS. 4-6 which shows three potential image planes and their associated 3D pose projections. Three potential image planes are shown for simplicity. Each of the three potential image planes represents that of a different respective potential pan rotation of the camera. In reality, there may be a larger number of potential image planes at different pan, tilt and/or roll camera rotations and/or different zoom levels. To reduce the number of potential image planes (thereby reducing the amount of necessary processing), the location of the rotatable camera is set (using the X, Y and Z coordinate system of the pitch)

and/or the limits on camera rotation (e.g. minimum and maximum pan, tilt and/or roll) and/or zoom (e.g. minimum and maximum zoom) are set.

Figure 4A:
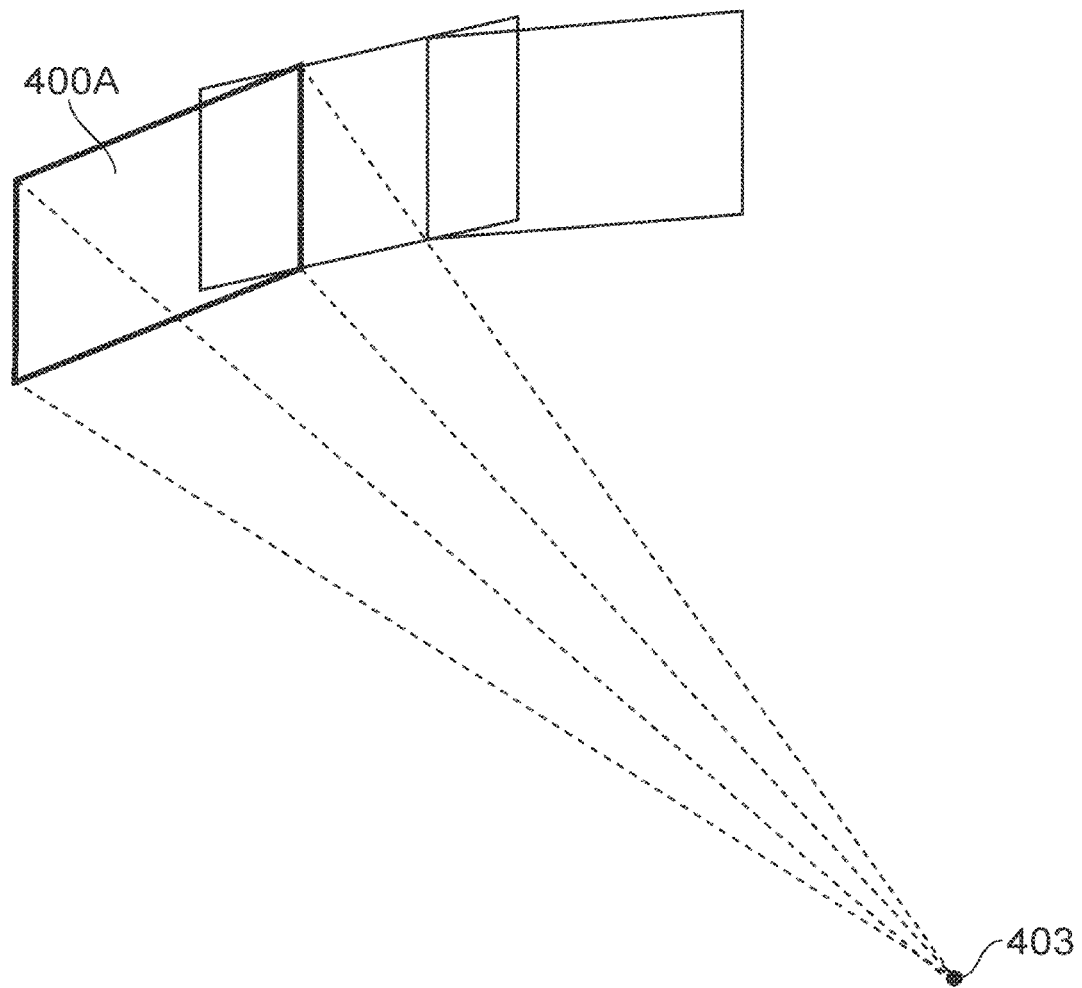
FIGS. 4A and 4B schematically show a player pose projection on a first candidate image plane during a soccer game.
Figure 4B:
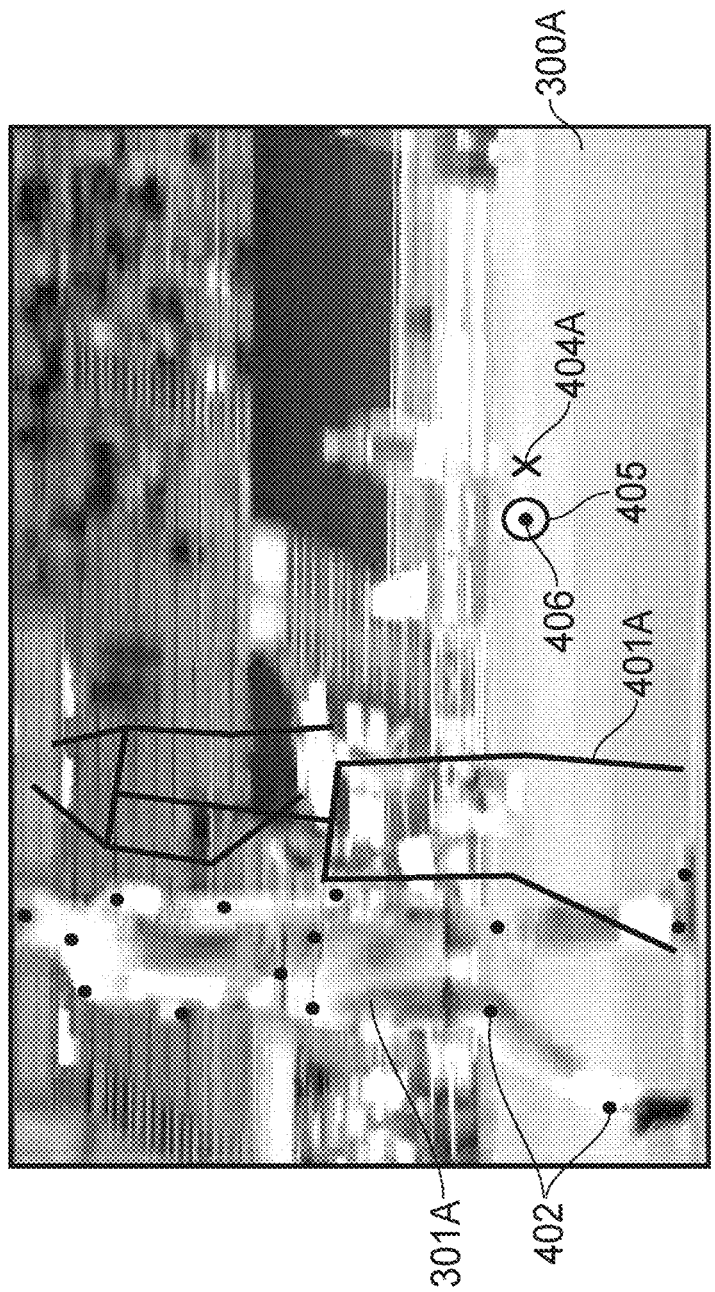

FIG. 4A shows a first potential image plane 400A. The image plane 400A is determined with respect to a fixed position 403 of the rotatable camera which captures the image 300A in the X, Y and Z coordinate system of the pitch. For simplicity, the pitch and objects are not shown in FIG. 4A. FIG. 4B shows the 3D pose projection 401A of the player 301B on the image plane 400A overlaid on the image 300A. The 2D pose of the player image 301A is indicated by markers 402. These are generated by the processor again using a suitable known algorithm from the field of articulated body pose estimation, for example. Each of the markers 402 indicates the position of a detectable part of the body of the player in the player image 301A. In this case, various joints of the player (e.g. knees, ankles, elbows and shoulders) and the player's waste and neck are indicated. The 3D pose projection 401A is misaligned with the 2D pose markers 402 indicating the image plane 400A is not the correct image plane 300B. The ball 405 is also visible in the captured image 300A. The position of the ball in the image 300A is detected by the processor 201 (e.g. using the distinctive spherical shape of the ball, the standardised size of the ball and/or distinctive visual markings on the ball and a semantic segmentation algorithm) and is indicated by marker 406. A 3D ball projection 404A on the image plane 400A based on the position of the ball on the pitch detected by the static cameras 101A is also shown. The 3D ball projection is also misaligned with the 2D ball position marker 406 indicating the image plane 400A is not the correct image plane 300B.

Figure 5A:
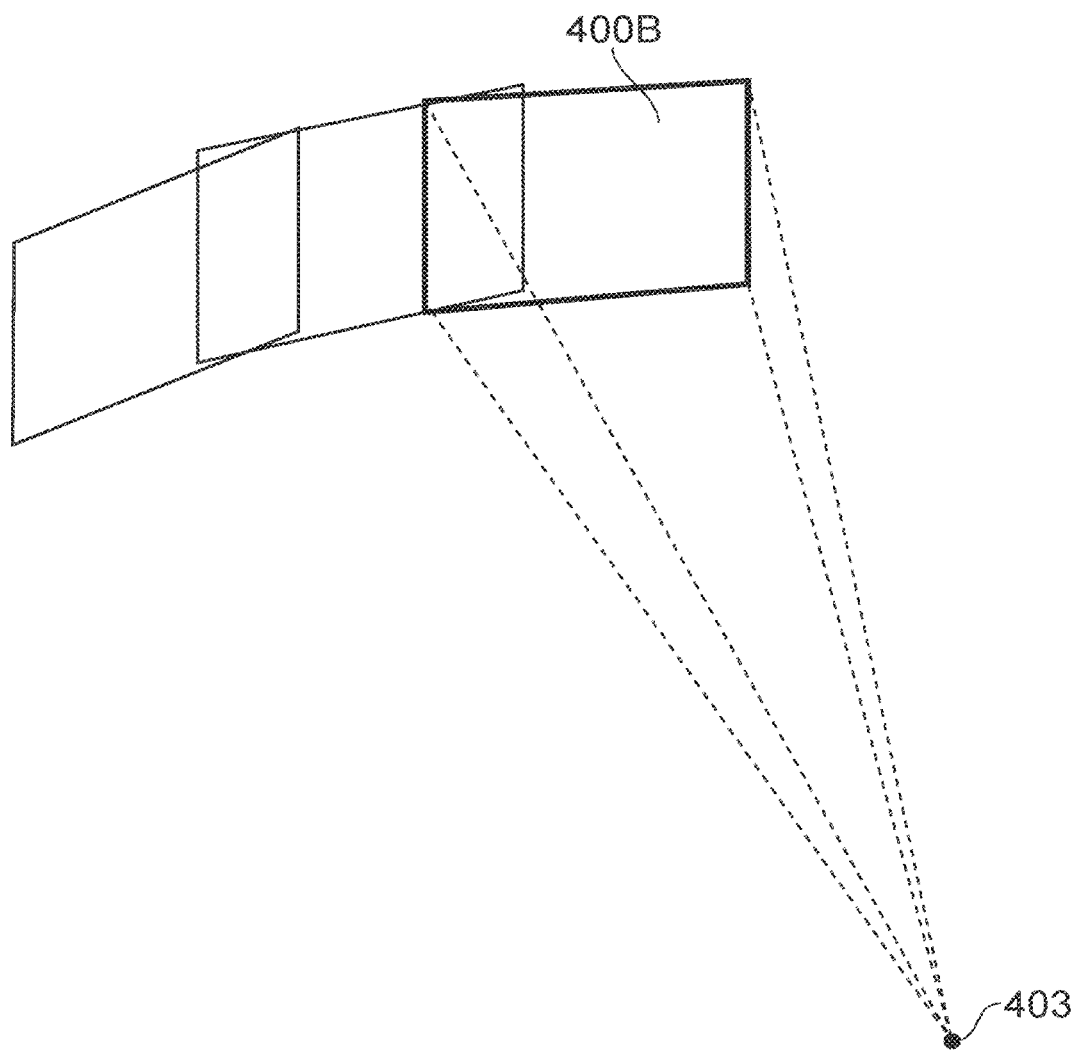
FIGS. 5A and 5B schematically show a player pose projection on a second candidate image plane during a soccer game.
Figure 5B:
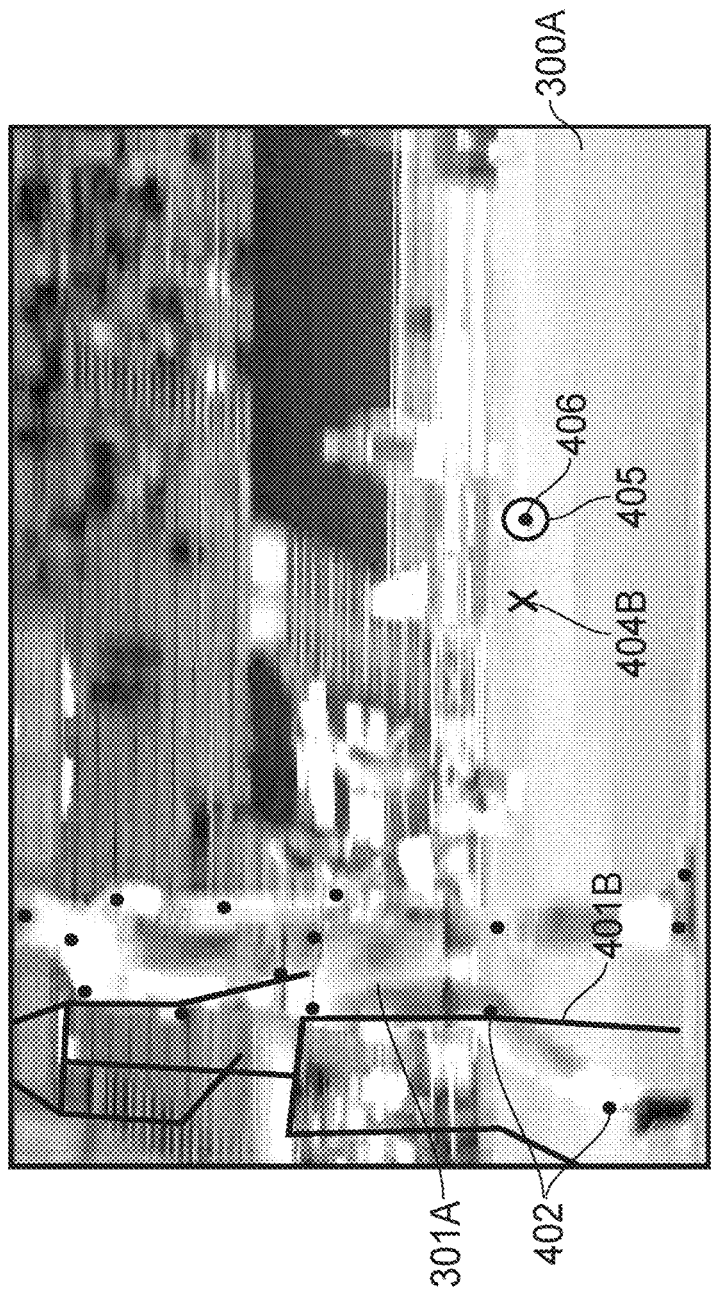

FIG. 5A shows a second potential image plane 400B. The image plane 400B is again determined with respect to the fixed position 403 of the rotatable camera which captures the image 300A. For simplicity, the pitch and objects are again not shown in FIG. 5A. FIG. 5B shows the 3D pose projection 401B of the player 301B on the image plane 400B overlaid on the image 300A. The 2D pose of the player image 301A is again indicated by markers 402. The 3D pose projection 401B is misaligned with the 2D pose markers 402 indicating the image plane 400B is not the correct image plane 300B. A 3D ball projection 404B on the image plane 400B is also shown. The 3D ball projection is also misaligned with the 2D ball position marker 406 indicating the image plane 400B is not the correct image plane 300B.

Figure 6A:
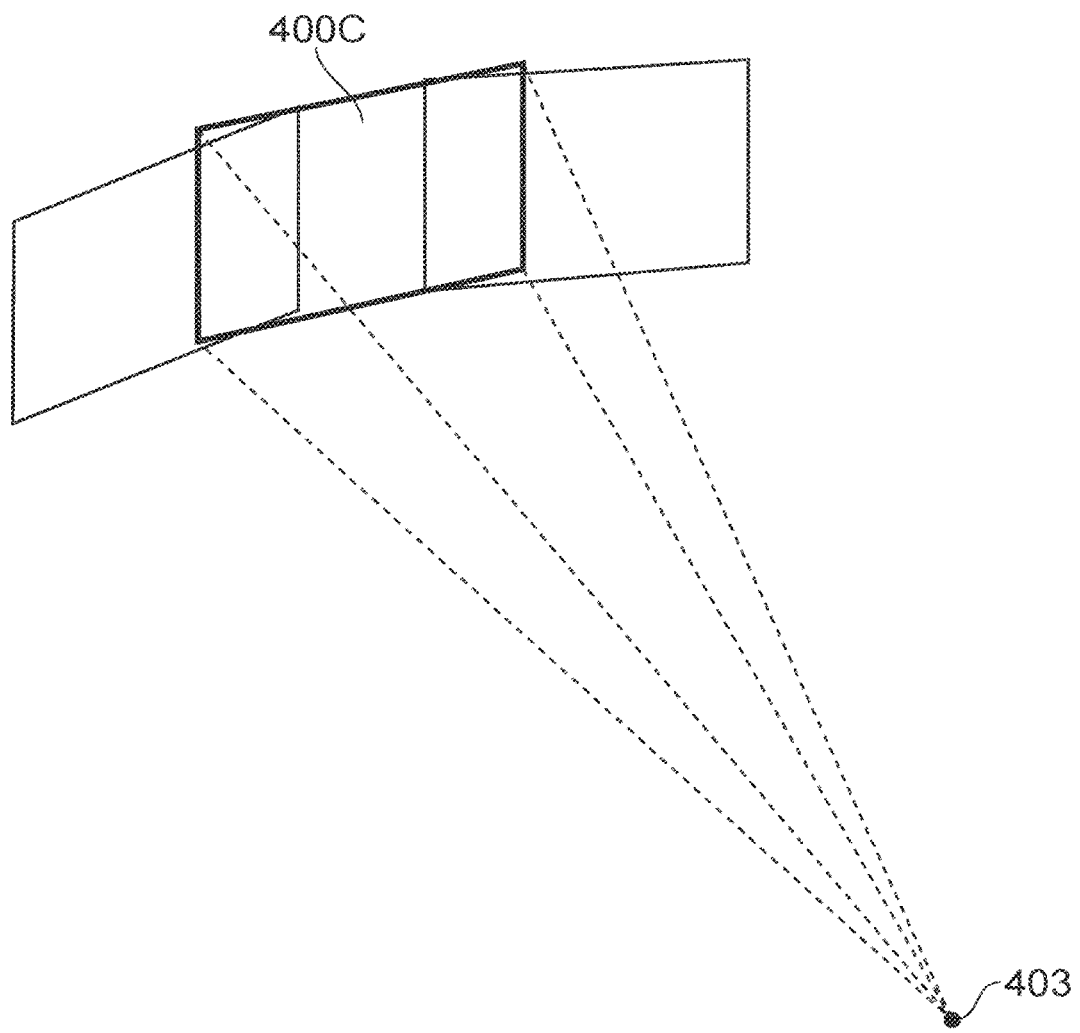
FIGS. 6A and 6B schematically show a player pose projection on a third candidate image plane during a soccer game.
Figure 6B:
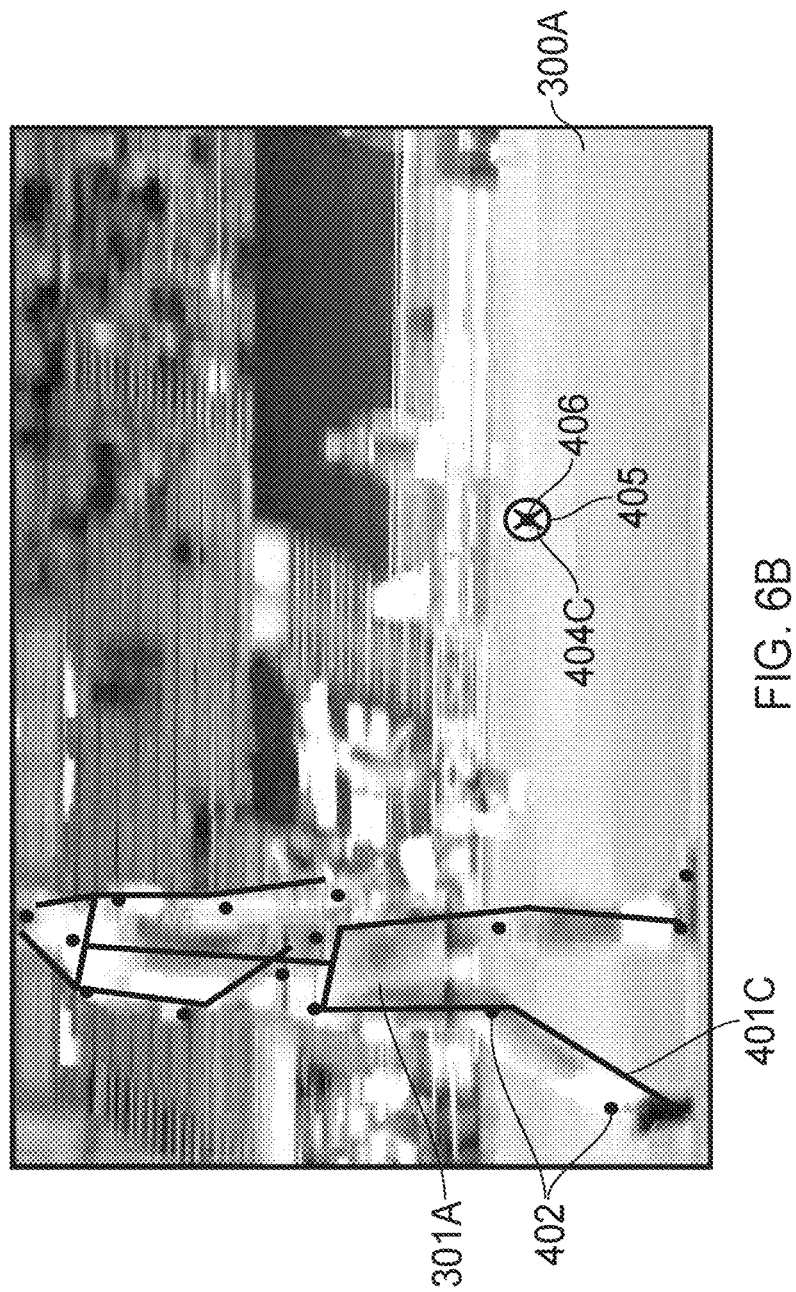

FIG. 6A shows a third potential image plane 400C. The image plane 400C is again determined with respect to the fixed position 403 of the rotatable camera which captures the image 300A. For simplicity, the pitch and objects are again not shown in FIG. 6A. FIG. 6B shows the 3D pose projection 401C of the player 301B on the image plane 400C overlaid on the image 300A. The 2D pose of the player image 301A is again indicated by markers 402. This time, the 3D pose projection 401C is aligned with the 2D pose markers 402 indicating the image plane 400C is the correct image plane 300B. A 3D ball projection 404C on the image plane 400C is also shown. The 3D ball projection is also aligned with the 2D ball position marker 406 indicating the image plane 400C is the correct image plane 300B.

A potential image plane may also be referred to as a candidate image plane.

Based on alignment of the 3D pose projection of the player 301B with the 2D pose of the player image 301A in one of the potential image planes (third potential image plane 400C in this case) associated with the rotatable camera which captured the image 300A, it is determined that the image 300A includes an image of the player 301A. The image 300A is therefore displayed as one of the images of the event concerned (e.g. one of images 207A-D). Alternatively, if it had turned out that none of the potential image planes 400A-C (or any other potential image planes) were associated with a 3D pose projection of the player 301B which was sufficiently aligned with the 2D pose of the player image 301A, it would be determined that the player image 301A does not correspond to the player 301B (i.e. it is most likely a different player) and therefore the image 300A is unlikely to relate to the event concerned. In this case, the image 300A is not displayed.

In an embodiment, determining if a 3D pose projection of a player on a potential image plane sufficiently aligns with a 2D pose of a player image in a captured image comprises, for example, determining a respective distance between each 2D pose marker 402 and a nearest line of the 3D pose projection 401A-C. Sufficient alignment is determined when the total of the distances is less than a predetermined threshold. If there are multiple image planes which provide sufficient alignment, the image plane with the lowest total of the distances is selected. Other methods of determining the extent of alignment may be used.

In an embodiment, one or more parameters of a rotatable camera 101B which captures an image are estimated to be those of the potential image plane which provides the best alignment. For example, the pan, tilt and/or roll angle and/or zoom level of the rotatable camera which capture the image 300A is estimated as the pan, tilt and/or roll angle and/or zoom level associated with the third potential image plane 400C. The pan, tilt and/or roll angle and/or zoom level of image planes defined in the (X, Y, Z) 3D space of the pitch are determined in advance for each (X, Y, Z) rotatable camera position and stored in the storage medium 203, for example. In an embodiment, if a predetermined maximum number of images are to be output (e.g. four images 207A-D) but more than the predetermined maximum number of images are determined to relate to the event concerned (e.g. if five images include the player 301A), the images are chosen using the determined camera parameters associated with those images. For example, the predetermined maximum number of images are chosen as those images which have the greatest zoom level (since these images are likely to show the event concerned in the most detail).

In the example of FIGS. 4-6, the 3D ball projection and 2D ball position in the captured image 300A are also used to determine whether any of the potential image planes 400A-C have sufficient alignment. In an embodiment, sufficient alignment is determined when the distance between the 3D ball projection 404A-C and the 2D ball position marker 206 is less than a predetermined threshold. If there are multiple potential image planes with sufficient alignment, the image plane with the lowest distance is selected. In an embodiment, the 3D ball projection 404A-C and 2D ball position marker 206 correspond to the position of the centre of the ball. The use of the ball position and player pose may be used in combination (as in the example of FIGS. 4-6) or on their own. When used together, a potential image plane is selected as the correct image plane when sufficient alignment is determined using both the ball position and player pose, for example.

In an embodiment, sufficient alignment is determined solely using the ball position. Because the ball is detectable by the processor 201 as a visually unique object on the pitch without the player pose processing, suitable rotatable camera images for events involving the ball can be determined quickly and with less processing. The player pose processing is then carried out on those images only if further image selection is required. Further image selection is required, for example, if the number of rotatable camera images including the ball is greater than a predetermined maximum number of images to be output. In this case, player pose processing is performed to select only images including one or more players involved in the event concerned. The player pose processing may also be carried out when a portion of the potential image planes are at different zoom levels. Due to the small (relative to the players), spherical shape of the ball, it is difficult to determine the correct zoom level of an image solely based on the ball.

Performing player pose processing allows the correct one of multiple potential image planes at different zoom levels to be detected more easily. This is because changes to the perceived appearance of large (relative to the ball) players in different poses are more apparent at different zoom levels.

Although FIGS. 1-6 relate to soccer, the present technique may be applied to other sports including other ball games such as American football, in particular, National Football League (NFL)®. An issue in NFL is knowing accurately where the ball is when a player's knee or elbow touches the ground to end a "down", as this is defined as the position for the "down". As there is often a melee of players when this happens, it can be difficult to see this position from fixed, wide cameras (such as cameras 101A) calibrated in traditional ways (e.g. using lines or other interesting points in the image). The present technique therefore allows player tracking information (e.g. position and pose) at the time and location of the "down" to be used to determine images of telephoto rotatable cameras (such as cameras 101B) which have the best view of the "down". In addition, if suitable camera parameter(s) and the correct image plane (defined with respect to the (X, Y, Z) coordinate system of the pitch) of the camera of each of these image are determined and the ball is detectable in these images, the position of the ball in the (X, Y, Z) coordinate system of the pitch may be accurately determined.

In NFL TV broadcasts, a graphic is sometimes shown to demarcate the line where the "down" resets. It is difficult for traditional camera calibration systems which rely on specific predetermined features in the image (e.g. specific lines on the pitch) which remain static between successively captured images to give an accurate calibration, especially in the case where there are lots of players in the image who may get in the way of the specific predetermined features. Calibration comprises determining a mapping between 3D points in the scene containing the pitch and 2D points in the captured image. Such mapping is needed to ensure the line demarcating where the "down" resets is at the correct location in the captured image.

On the other hand, with the present technique, having more players in the shot actually improves the calibration (since the player positions and poses enable the correct camera calibration to be determined, as described). This allows graphics to be shown in any camera (static or rotatable) without relying on specific predetermined static image features which might be obscured.

In addition to the line graphic mentioned above, other graphics such as virtual advertising graphics on ad hoardings or on the pitch may be added. This increases the air time for advertisers (as they can be shown on zoomed in shots from rotatable cameras as well as wide shots from fixed cameras, for example) and reduces the need for physically painting adverts on the pitch.

FIGS. 7-10 show a second example of the present technique relating to racing. The example here is horse racing. However, the present technique is applicable to different types of racing such as motor racing. The second example of the present technique is implemented by the data processing apparatus 200. The data processing apparatus 200 may be configured to implemented one or both of the first and second examples of the present technique.

Figure 7A:
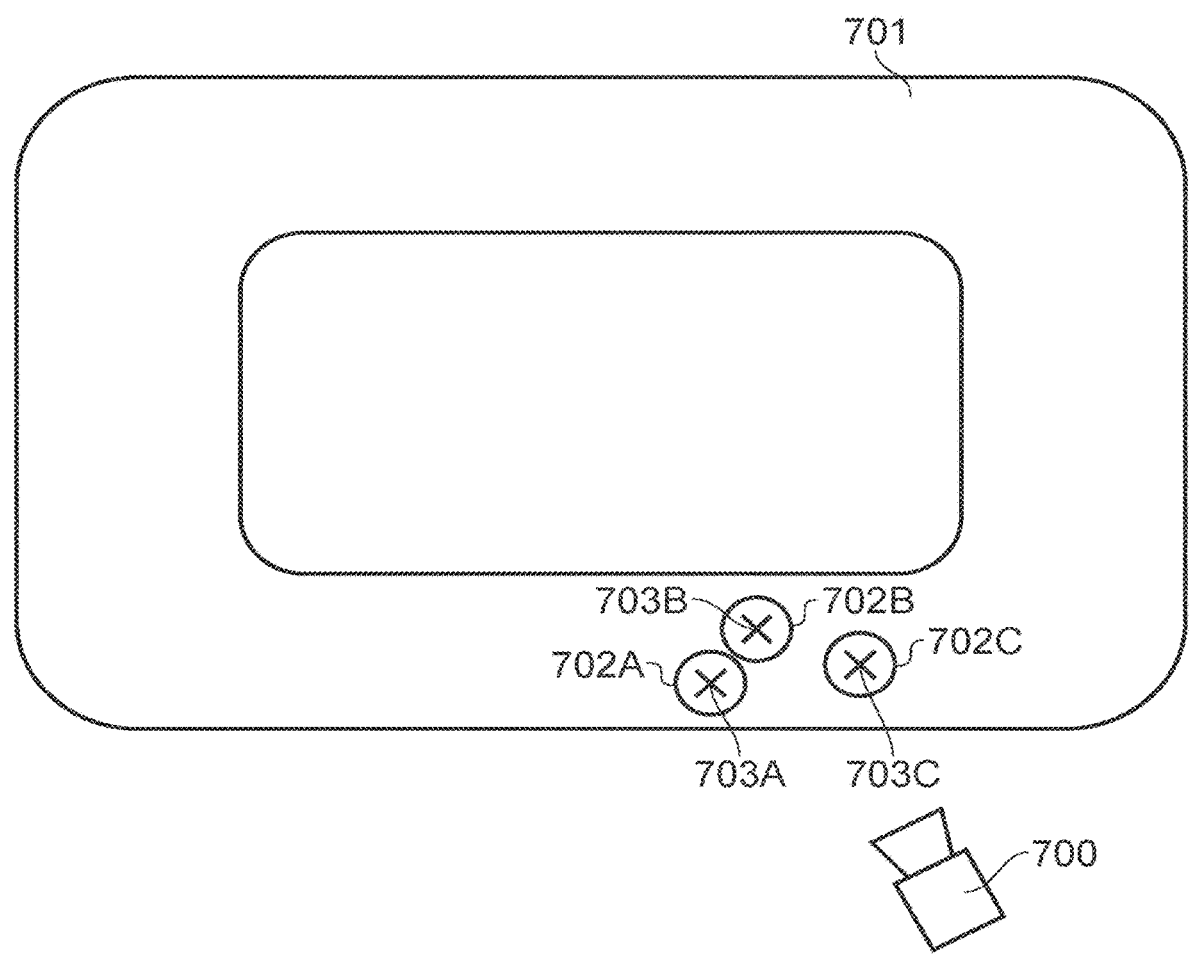
FIGS. 7A and 7B schematically show a first set of projected GNSS coordinates on an image.
Figure 7B:
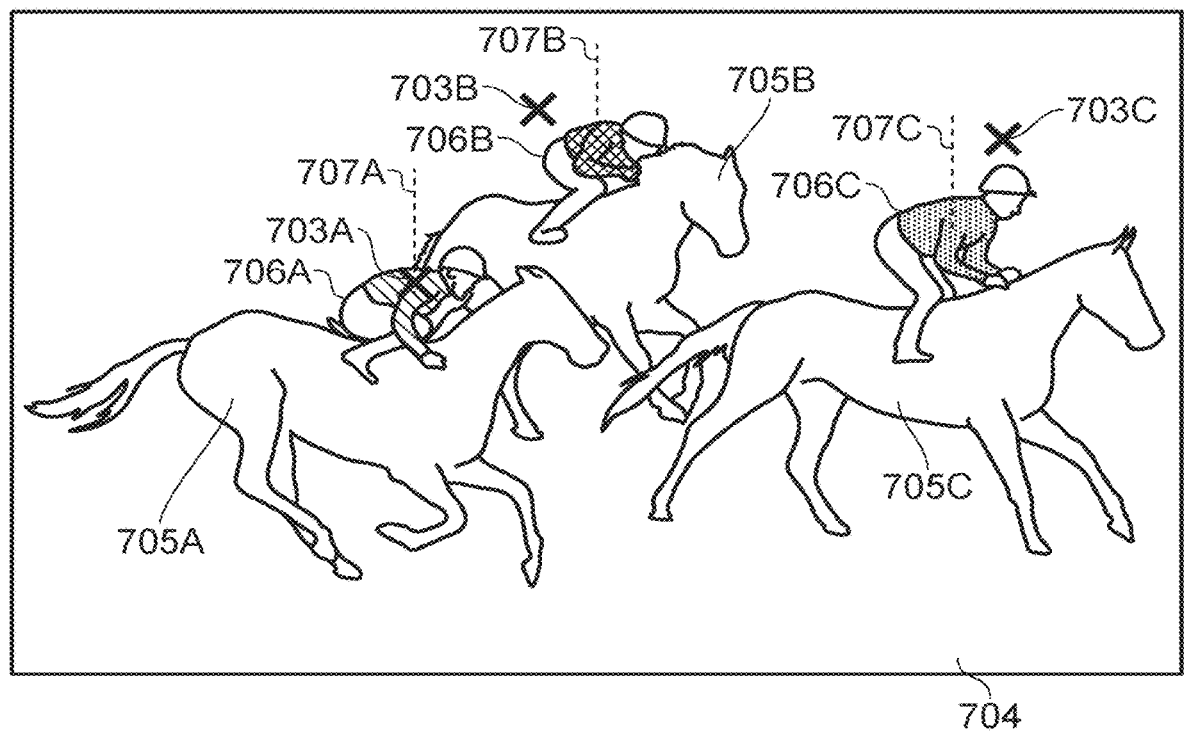

FIG. 7A shows a bird eye view of a racecourse 701. A static camera 700 captures images of the racecourse. An image 704 captured by the camera 700 is shown in FIG. 7B. The static camera 700 is calibrated with respect to the racecourse in advance so that so that the position of an object on the racecourse and within the field of view of the camera is mapped to a corresponding position of that object in the image 704. Image data representing the captured image 704 is received by the camera interface 205. The image 704 includes horses 705A-C ridden by jockeys 706A-C on the racecourse. Each jockey is wearing a GNSS receiver (not shown) which determines a GNSS position of the jockey as they travel around the racecourse and transmits information identifying the jockey (a jockey ID such as a predetermined number) and indicating the determined GNSS position to the GNSS interface 214. GNSS position information is useful in racing since it allows the position of each participant of the race (the jockeys in this example) to be tracked throughout the race.

However, GNSS position information has limited accuracy. For example, the Global Positioning System (GPS) GNSS is usually accurate to within a few metres. This limits the use of GNSS positioning in a race. For example, for participants which are within a distance to each other which approximates the accuracy of the GNSS positioning, it is not possible to reliably determine which of the participants is in front of the other. Each determined GNSS position is therefore associate with a margin of error. This is illustrated in FIG. 7A which shows the range of potential GNSS positions for each jockey at the time the image 704 was captured. Specifically, the circle 702A bounds the range of potential GNSS positions of the jockey 706A. The circle 702B bounds the range of potential GNSS positions of the jockey 706B. the circle 702C bounds the range of potential GNSS positions of the jockey 706C. There is therefore a desire to improve the accuracy with which the position of each jockey is determined.

The present technique enables such an improvement by projecting a potential GNSS position of each jockey onto the image 704 and comparing the projected potential GNSS position with the actual position of the jockey in the image. This projection is possible due to the calibration of the camera 700 which captures the image 704 with respect to the racecourse 701.

The position of each jockey in the image is determined by determining the position of the visual centre of mass of the jockey, for example. The jockeys are distinguishable from each other because the set of clothes (known as "silks") worn by each jockey comprises distinct visual markings which are recognisable by the processor 201 performing, for example, a semantic segmentation algorithm on the image 704. For example, the jockey 706A is wearing silks with vertical stripes, the jockey 706B is wearing silks with a hash pattern and the jockey 706C is wearing silks with a chessboard pattern. The storage medium 203 records an association between the jockey ID and silk visual marking of each jockey.

This allows the processor 201 to compare the projected potential GNSS position of each jockey with the detected position of that jockey in the image 704. If the projected potential GNSS position of a jockey is within a predetermined distance of the position of the jockey in the image, the potential GNSS position is determined to be sufficiently accurate. The potential GNSS position (or information such as a visual graphic determined using the potential GNSS position) is then output to via the user interface 205. However, if the projected potential GNSS position of the jockey is not within the predetermined distance of the position of the jockey in the image, the potential GNSS position is determined not to be sufficiently accurate. A different potential GNSS position is then selected and the process is repeated. This is exemplified in FIGS. 7-9.

FIG. 7A shows an initial potential GNSS position 703A-C for each jockey 706A-C. FIG. 7B shows the projections of the initial potential GNSS positions 703A-C. Lines 707A-C respectively show the position in a horizontal dimension of the visual centre of mass of each jockey.

The projected potential GNSS position 703A is aligned with the line 707A. The potential GNSS position 703A therefore appears to be accurate. In this case, the distance between the projected potential GNSS position 703A and the line 707A is less than the predetermined threshold, and therefore the potential GNSS position is output as the position of the jockey 706A at the time the image 704 was captured.

On the other hand, the projected potential GNSS positions 703B and 703C are not aligned with the lines 707B and 707C, respectively. The potential GNSS positions 703B and 703C therefore do not appear to be accurate. In this case, the distance between the projected potential GNSS positions 703B and 703C and the lines 707B and 707C are greater than the predetermined threshold. The potential GNSS positions must therefore be updated.

Figure 8A:
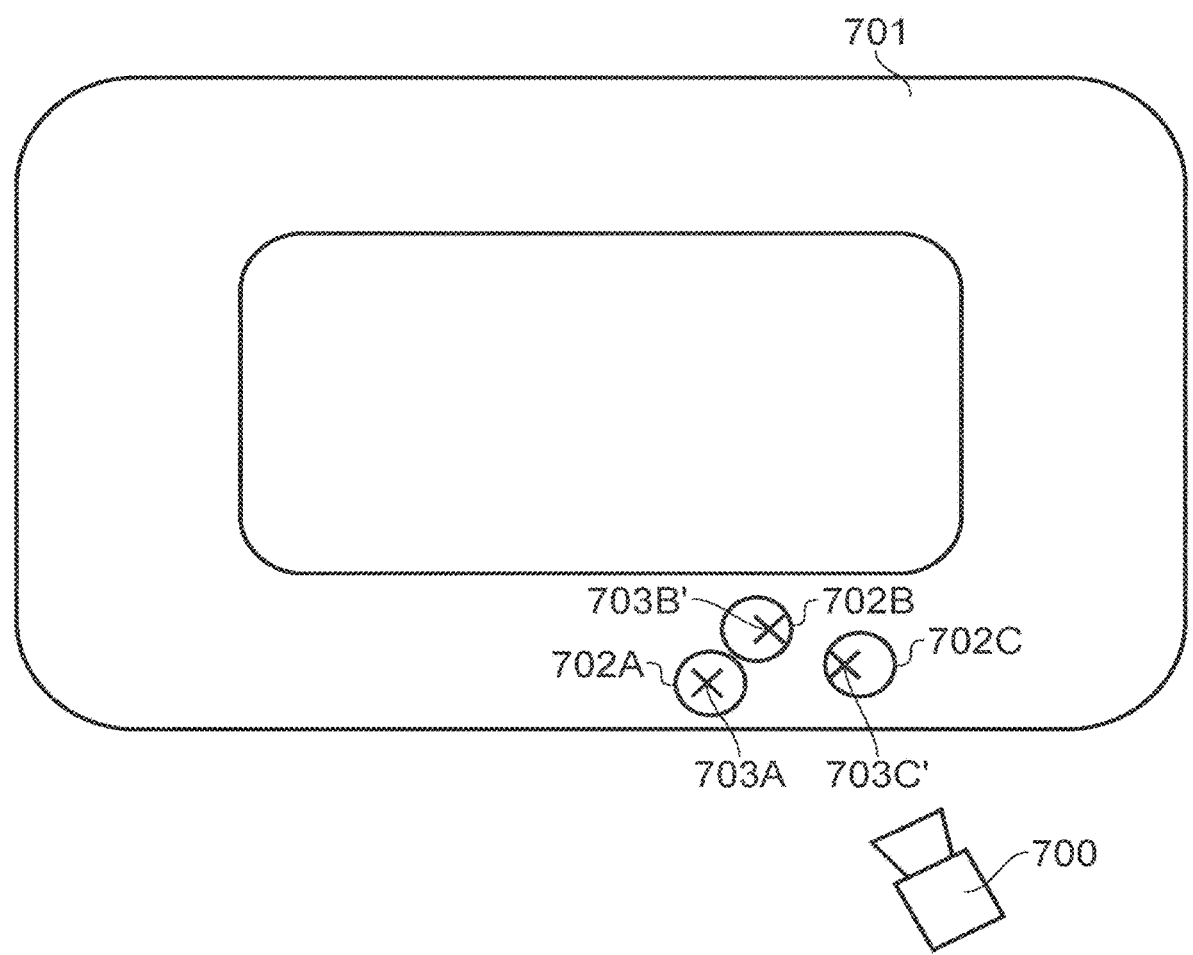
FIGS. 8A and 8B schematically show a second set of projected GNSS coordinates on an image.
Figure 8B:
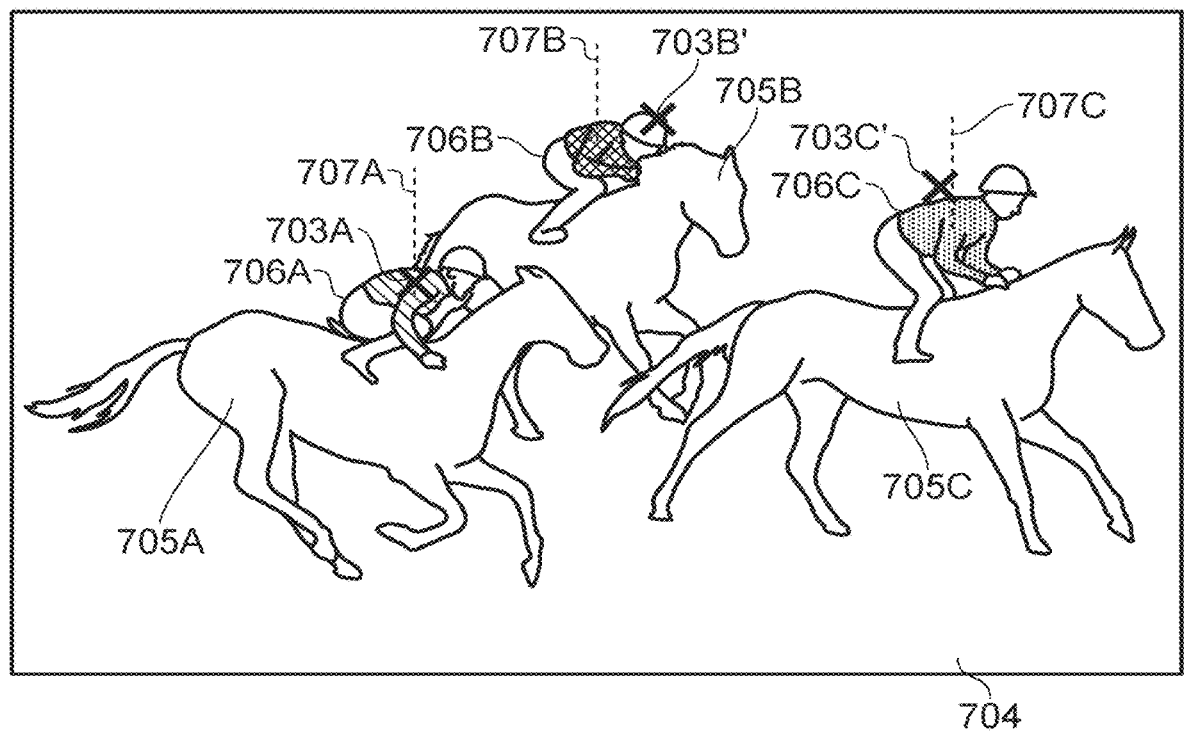

FIGS. 8A and 8B show updated potential GNSS positions 707B' and 707C' for the jockeys 706B and 706C. Initial GNSS position 707A is not updated because it was determined to be sufficiently accurate. Updated potential GNSS position 7038' is to the right to try to compensate for initial potential GNSS position 703B being too far to the left of line 707B. Updated potential GNSS position 703C' is to the left to try to compensate for initial potential GNSS position 703C being too far to the right of line 707B. The resulting updated projected potential GNSS positions 703B' and 703C' are shown in FIG. 8B. They are still not aligned with the lines 707B and 707C, respectively, and therefore still do not appear to be accurate. In particular, updated projection 703B' is now the right of line 707B by more than the predetermined threshold and updated projection 703C' is now to the left of line 707C by more than the predetermined threshold. The potential GNSS positions must therefore be further updated.

Figure 9A:
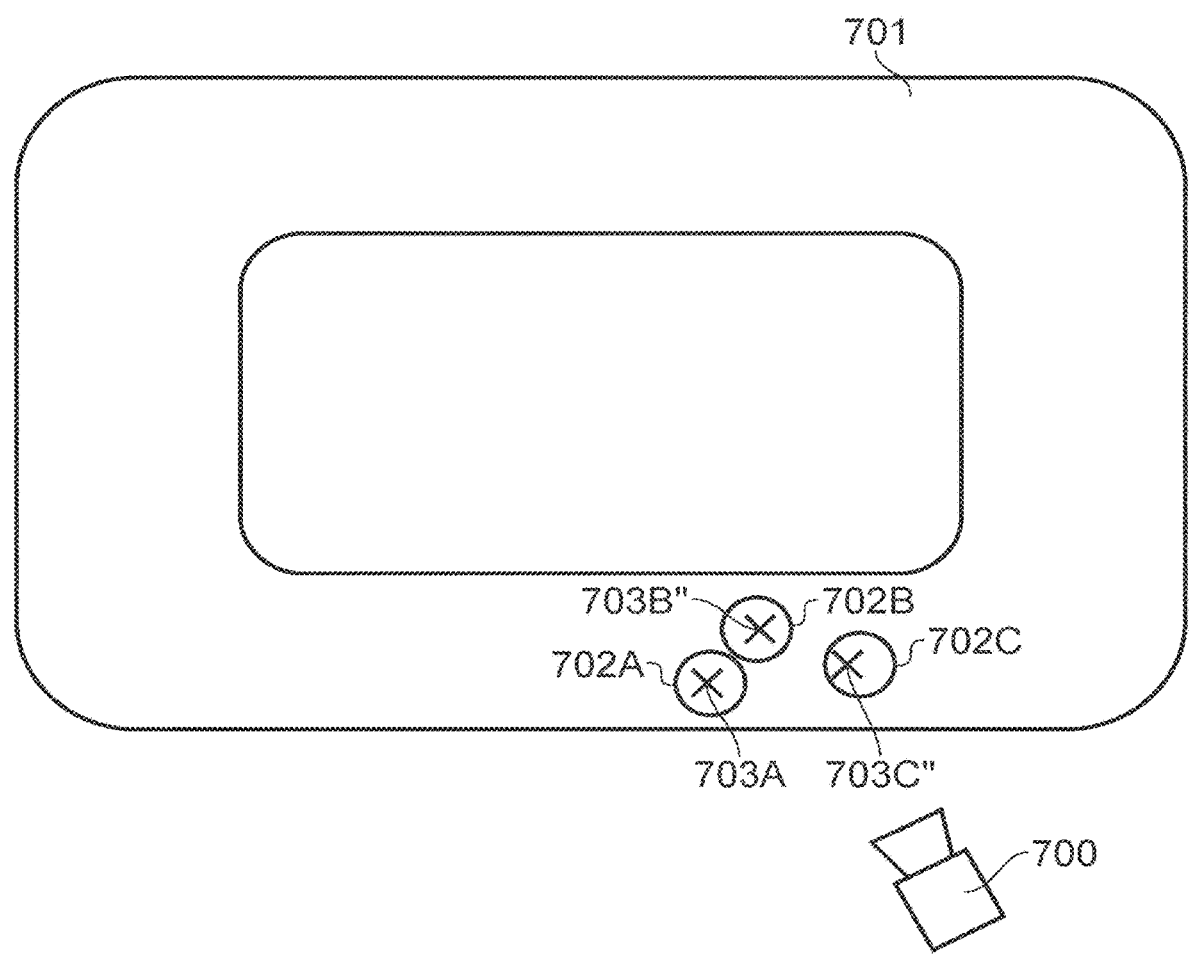
FIGS. 9A and 9B schematically show a third set of projected GNSS coordinates on an image.
Figure 9B:
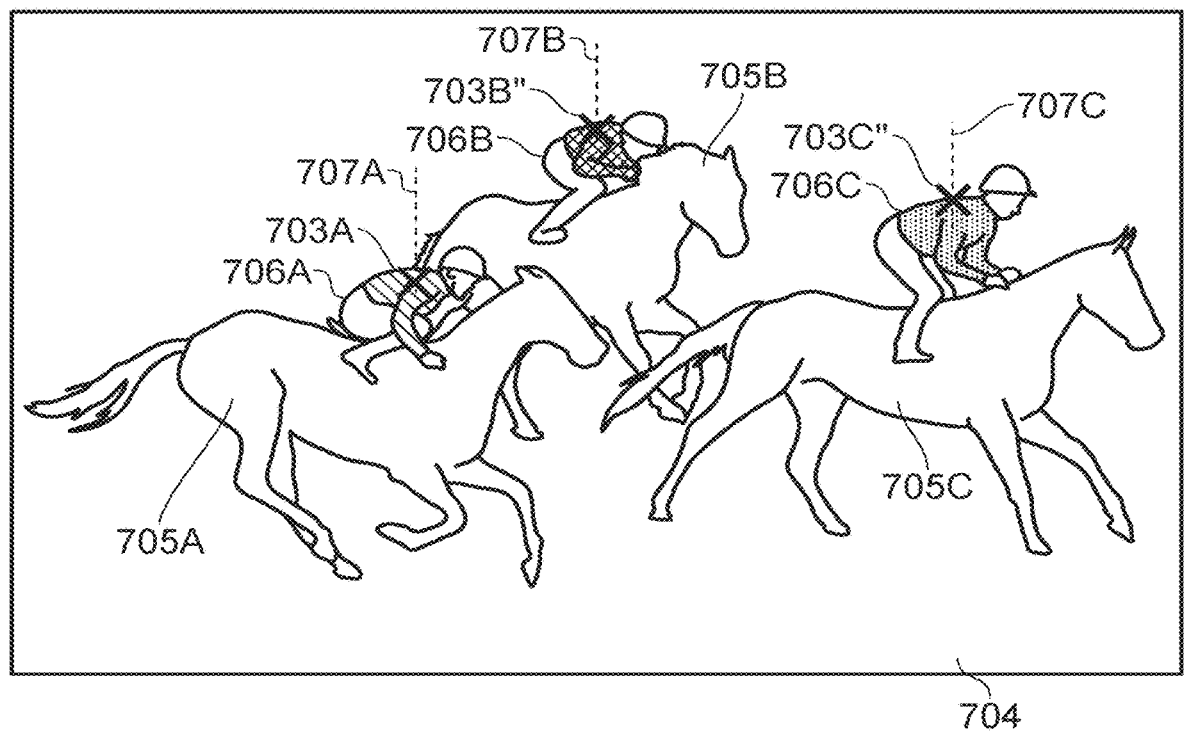

FIGS. 9A and 9B show further updated potential GNSS positions 707B" and 707C" for the jockeys 7068 and 706C. Initial GNSS position 707A is again not updated because it was determined to be sufficiently accurate. Further updated potential GNSS position 703B" is to the right of initial position 703B and to the left of updated position 703B'. Further updated potential GNSS position 703C" is to the left of initial position 703C and to the right of updated position 703C'. The resulting further updated projected potential GNSS positions 703B" and 703C" are shown in FIG. 8B. They are now aligned with the lines 707B and 707C, respectively, and therefore appear to be accurate. In this case, the distance between the further projection 703B" and the line 7078 is less than the predetermined threshold. Similarly, the distance between the further projection 7030" and the line 707C is less than the predetermined threshold. The further updated potential GNSS positions 703B" and 703C" are therefore output as the positions of the jockeys 7068 and 706C, respectively, at the time the image 704 was captured.

The present technique therefore allows the accuracy of the GNSS position of each jockey to be improved.

In a variation of the second example, the camera 700 may be a rotatable camera rather than a static camera which, like the rotatable cameras 101B of the first example, has a known (X, Y, Z) position with respect to the racecourse 701 (an X, Y and Z coordinate system being defined with respect to the racecourse in advance) but an unknown yaw, pitch, tilt and/or zoom level. In this case, the image plane onto which the potential GNSS positions are projected is not known in advance. Each potential GNSS position of each jockey is therefore projected onto each of a plurality of potential image planes (e.g. as exemplified in FIGS. 4A, 5A and 6A) and the process exemplified in FIGS. 7-9 is repeated for each potential image plane.

For each potential image plane associated with a yaw, pitch, tilt and/or zoom level not sufficiently close to those of the camera 700, it will not be possible for a set of GNSS projections to be found which are each within the predetermined threshold distance of a corresponding jockey in the image 704. However, for a potential image plane which is associated with a yaw, pitch, tilt and/or zoom level which are sufficiently close to those of the camera 700, it will be possible for a set of GNSS projections to be found which are each within the predetermined threshold distance of a corresponding jockey in the image 704. This allows both the correct image plane (and therefore the correct camera parameters including yaw, pitch, tilt and/or zoom level of the camera when it captured the image 704) and improved accuracy GNSS positions to be determined, If there is a plurality of potential image planes with a set of adjusted GNSS projections each within the predetermined threshold distance, the potential image plane with the adjusted GNSS projections closest to the corresponding jockeys in the image (e.g. based on the total of the respective projection and jockey distances) is output as the correct image plane, for example.

The accuracy of the determined camera parameters and/or GNSS positions may be further improved.

In one example, the GNSS position accuracy is further improved by performing the above-mentioned process for each of a plurality of images captured by a plurality of respective cameras at the same time. In this case, there are one or more cameras in addition to camera 700. The adjusted GNSS positions which are output are based on the adjusted GNSS positions determined for each image. For example, the average of the adjusted GNSS position for each jockey over all images is output.

In another example, the camera parameter accuracy is further improved by performing the above-mentioned process for each of a plurality images successively captured by the same camera 700 when the camera 700 is stationary (not rotating). The estimated camera parameter(s) which are output are based on the estimated camera parameter(s) determined for each image. For example, the average of the estimated camera parameter(s) over all images is output.

These examples may both be carried out to improve both camera parameter and GNSS position accuracy. These examples help alleviate the effects of errors in the camera parameter and/or GNSS position determination. Such errors occur, for example, due to errors in the object detection (e.g. if an object in the image is motion blurred, it is difficult to determine the precise position of that object), errors in the GNSS data, errors in the calculation of the (X, Y, Z) position of the camera or errors in the mapping between the GNSS coordinate system and (X, Y, Z) coordinate system defined for the racecourse.

Figure 10:
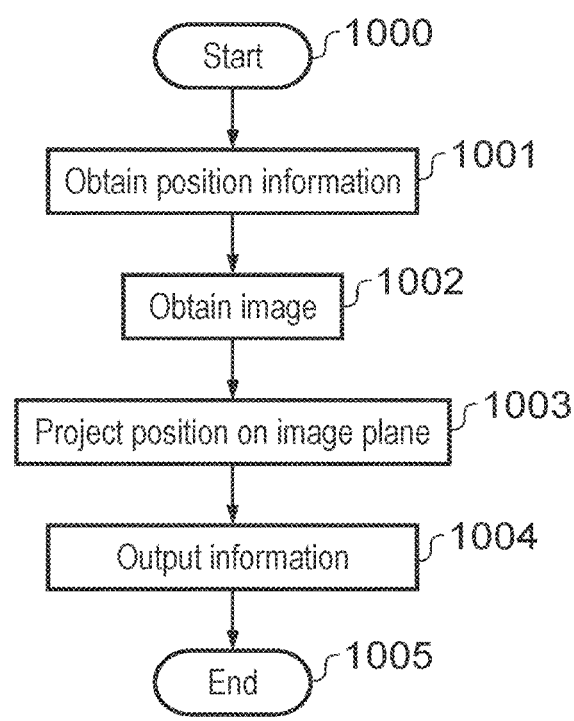
FIG. 10 shows a method according to an embodiment.

FIG. 10 shows a method according to an embodiment. The method is implemented by the data processing apparatus 200 under control of the processor 201. The described first and second examples are examples of the method of claim 10.

The method starts at step 1000.

At step 1001, information identifying a position of an object in a scene at a time during a sporting event is obtained. For example, the information is image data from one or more static cameras 101A which allow the position of a soccer player on the soccer pitch 100 to be determined. As another example, the information comprises GNSS coordinates of a jockey riding a race horse.

At step 1002, an image of the scene captured at the time during the sporting event is obtained. For example, the image (e.g. image 300A) is of a soccer player captured by one of the rotatable cameras 101B. As another example, the image (e.g. image 704) is of a horse race captured by the static or rotatable camera 700.

At step 1003, the position of the object in the scene is projected onto an image plane of the image. For example, pose projections 401A-C of a soccer player are projected onto image 300A. As another example, potential GNSS positions 703A-C of jockeys are projected onto image 704. When the camera 101B and/or camera 700 are rotatable with unknown yaw, pitch, roll and/or zoom, the image plane is one of a plurality of candidate image planes onto which projections occur.

At step 1004, information is output based on the projection. For example, the information comprises images 207A-D featuring a soccer player involved in an event during a soccer match which is to be reviewed and/or one or more estimated camera parameters (e.g. yaw, tilt, pitch and/or zoom) of the respective rotatable cameras 101B which captured the images 207A-D. As another example, the information is adjusted GNSS coordinates of a jockey and/or one or more estimated camera parameters (e.g. yaw, tilt, pitch and/or zoom) of the camera 700 when the camera 700 is rotatable.

The method ends at step 1005.

Embodiments of the present technique are defined by the following numbered clauses:

1. A data processing method comprising:
    obtaining information identifying a position of an object in a scene at a time during a sporting event;
    obtaining an image of the scene captured at the time during the sporting event;
    projecting the position of the object in the scene onto an image plane of the image; and
    outputting information based on the projection.
2. A data processing method according to clause 1 comprising:
    obtaining information indicating a visual characteristic of the object which distinguishes it from one or more other objects in the scene; and
    determining if the object is in the image using the visual characteristic of the object.
3. A data processing method according to clause 2, wherein:
    determining if the object is in the image comprises:
    projecting the position of the object in the scene onto a plurality of candidate image planes of the image, and
    for each candidate image plane, determining if a portion of the image at the projected position of the object has the visual characteristic of the object; and
    determining the object is in the image if, for one candidate image plane, the portion of the image at the projected position of the object has the visual characteristic of the object,
    wherein the one candidate image plane is determined as the image plane of the image.
4. A data processing method according to clause 3, wherein the output information indicates the image.
5. A data processing method according to clause 3 or 4, wherein the output information indicates one or more camera parameters associated with the one candidate image plane.
6. A data processing method according to any one of clauses 2 to 5, wherein the visual characteristic of the object comprises a pose of the object or a visual marking on the object.
7. A data processing method according to any preceding clause, wherein the position of the object in the scene is determined using a plurality of images of the object simultaneously captured by a plurality of respective cameras each calibrated with respect to the scene.
8. A data processing method according to any one of clauses 1 to 6, wherein the information identifying the position of the object in the scene comprises Global Navigation Satellite System GNSS coordinates of the object.
9. A data processing method according to clause 8, wherein the object is in the image and the method comprises:
    comparing the projected position of the GNSS coordinates of the object on the image plane of the image with the position of the object in the image;
    if there is a discrepancy between the projected position of the GNSS coordinates of the object on the image plane of the image and the position of the object in the image:
    adjust the GNSS coordinates of the object to reduce the discrepancy; and
    include the adjusted GNSS coordinates in the output information.
10. A data processing method according to any preceding clause wherein the sporting event is a ball game and the object is a ball game participant or a ball.
11. A data processing method according to clause 10 wherein the sporting event is a soccer match.
12. A data processing method according to clause 10, wherein the sporting event is an American football game.
13. A data processing method according to any one of clauses 1 to 9 wherein the sporting event is a race and the object is a race participant.
14. A data processing method according to clause 12 wherein the sporting event is a horse race.
15. A program for controlling a computer to perform a method according to any preceding clause.
16. A non-transitory storage medium storing a program according to clause 15.
17. A data processing apparatus comprising circuitry configured:
    to obtain information identifying a position of an object in a scene at a time during a sporting event;
    to obtain an image of the scene captured at the time during the sporting event;
    to project the position of the object in the scene onto an image plane of the image; and
    to output information based on the projection.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A data processing method comprising:
    obtaining information identifying a position of an object in a scene at a time during a sporting event;
    obtaining an image of the scene captured at the time during the sporting event;
    projecting the position of the object in the scene onto an image plane of the image;
    outputting information based on the projection;
    obtaining information indicating a visual characteristic of the object which distinguishes it from one or more other objects in the scene; and
    determining if the object is in the image using the visual characteristic of the object, wherein
    the determining if the object is in the image includes:
        projecting the position of the object in the scene onto a plurality of candidate image planes of the image,
        for each candidate image plane, determining if a portion of the image at the projected position of the object has the visual characteristic of the object, and
        determining the object is in the image if, for one candidate image plane, the portion of the image at the projected position of the object has the visual characteristic of the object, and
        the one candidate image plane is determined as the image plane of the image.

2. The data processing method according to claim 1, wherein the output information indicates the image.

3. The data processing method according to claim 1, wherein the output information indicates one or more camera parameters associated with the one candidate image plane.

4. The data processing method according to claim 1, wherein the visual characteristic of the object comprises a pose of the object or a visual marking on the object.

5. The data processing method according to claim 1, wherein the position of the object in the scene is determined using a plurality of images of the object simultaneously captured by a plurality of respective cameras each calibrated with respect to the scene.

6. The data processing method according to claim 1, wherein the information identifying the position of the object in the scene comprises Global Navigation Satellite System GNSS coordinates of the object.

7. The data processing method according to claim 6, wherein
    the object is in the image, and
    the method comprises:
        comparing the projected position of the GNSS coordinates of the object on the image plane of the image with the position of the object in the image; and
        if there is a discrepancy between the projected position of the GNSS coordinates of the object on the image plane of the image and the position of the object in the image:
            adjusting the GNSS coordinates of the object to reduce the discrepancy; and
            including the adjusted GNSS coordinates in the output information.

8. The data processing method according to claim 1, wherein the sporting event is a ball game and the object is a ball game participant or a ball.

9. The data processing method according to claim 8, wherein the sporting event is a soccer match.

10. The data processing method according to claim 8, wherein the sporting event is an American football game.

11. The data processing method according to claim 1, wherein the sporting event is a race and the object is a race participant.

12. The data processing method according to claim 11, wherein the sporting event is a horse race.

13. A non-transitory storage medium storing a program for controlling a computer to perform the method according to claim 1.

* * * * *